United States Patent
Klots et al.

Patent Number: 5,832,521
Date of Patent: Nov. 3, 1998

[54] METHOD AND APPARATUS FOR PERFORMING CONSISTENT READS IN MULTIPLE-SERVER ENVIRONMENTS

[75] Inventors: Boris Klots, Palo Alto; Roger J. Bamford, Woodside, both of Calif.

[73] Assignee: Oracle Corporation, Redwood Shores, Calif.

[21] Appl. No.: 808,622

[22] Filed: Feb. 28, 1997

[51] Int. Cl.⁶ .................................................. G06F 17/30
[52] U.S. Cl. ............................. 707/203; 707/4; 707/10; 707/204; 707/103; 395/200.33; 395/200.47; 395/200.49
[58] Field of Search .................... 1/1; 707/4, 10, 707/103; 379/111; 380/25; 382/125, 155; 395/200.33, 200.47, 200.49, 683

[56] References Cited

U.S. PATENT DOCUMENTS

| | | | |
|---|---|---|---|
| 5,285,494 | 2/1994 | Sprecher | 379/111 |
| 5,341,478 | 8/1994 | Travis | 707/10 |
| 5,627,886 | 5/1997 | Bowman | 379/111 |
| 5,706,349 | 1/1998 | Aditham | 380/25 |
| 5,745,748 | 4/1998 | Adham | 1/1 |

*Primary Examiner*—Thomas G. Black
*Assistant Examiner*—Diane D. Mizrahi
*Attorney, Agent, or Firm*—McDermott, Will & Emery

[57] ABSTRACT

A method and apparatus for supplying a particular version of a data item to a transaction executing in a first database server is provided. The data item is in a database accessible by the first database server and one or more other database servers. The method involves determining whether a current version of the data item resides in a cache that is remote relative to the first database server. If the current version of the data item does not reside in a cache that is remote relative to the first database server, then a first derivation mechanism that is local to the first database server to derives the particular version of the data item from the current version of the data item. If the current version of the data item resides in a cache that is remote relative to the first database server, then a second derivation mechanism that is local to the cache derives the particular version of the data item from the current version of the data item. Once built, the particular version of the data item sent to the first database server. Determining whether a current version of the data item resides in a cache that is remote relative to the first database server may be performed by determining whether a process currently holds a write lock on the data item, and if a process currently holds a write lock on the data item, then determining whether the process is remote relative to the first database server.

20 Claims, 5 Drawing Sheets

METHOD AND APPARATUS FOR PERFORMING CONSISTENT READS IN MULTIPLE-SERVER ENVIRONMENTS

FIELD OF THE INVENTION

The present invention relates to multiple-server environments, and more specifically, to techniques for performing consistent reads in multiple-server environments.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, it is possible for the transactions to interact in undesirable ways.

To ensure predictable and reproducible results, techniques have been developed which protect concurrently executing transactions from interacting with one another in uncontrolled ways. Transactions are designed to make database changes in such a way that the database, as a whole, moves from one consistent state to another. As long as the database is consistent when the transaction completes, it is acceptable for the database to temporarily become inconsistent from the viewpoint of a single transaction during the execution of the transaction.

Not only must transactions leave the database in a consistent state upon completion, but transactions must also see the database in a consistent state while they are executing. This condition is difficult to satisfy because there may be concurrently executing transactions, each of which may be causing a temporary inconsistency visible only within that single transaction. Consequently, transactions must not be able to see the changes made by concurrently executing transactions until those transactions commit (i.e. terminate and make their changes permanent).

One approach to ensure that transactions do not see changes made by concurrently executing transactions is to prevent transactions from reading a data item that has been updated until the transaction that updated the data item commits. However, this approach reduces the concurrency in the system by causing transactions that wish to read data items (readers) to wait for transactions that have updated the data items (writers) to commit.

An alternate approach to ensure that readers do not see changes made by concurrently executing transactions involves presenting snapshots of the database to the readers. According to the snapshot approach, every version of a data item supplied to a reader transaction belongs to a "snapshot" of the database. A snapshot includes all updates that were committed to the database as of a given time and any updates made by the reader transaction itself, but no updates made by other transactions that were not committed as of that given time. If no such version of a data item actually exists, the version must be derived from an existing version of the data item.

For example, assume that a data item DATA1 has been updated by three transactions TXA, TXB, and TXC, in that order. TXA and TXB have committed before a time T, and TXC did not commit until time T+1. When a fourth transaction TXD associated with the snapshot time T wishes to read DATA1, the version of DATA1 that reflects all of the updates made to DATA1 (the "current version") cannot be supplied to TXD because the current version of DATA1 reflects changes made by a transaction TXC that committed after time T. However, the changes made by TXC may be removed from DATA1 to produce a "derived" version of DATA1, which may then be supplied to TXD. One implementation of a snapshot approach is described in pending U.S. patent application Ser. No. 08/613,026, entitled Method and Apparatus for providing Isolation Levels in a database System, filed on Mar. 11, 1996.

The portion of a database system that supplies data to the database server is referred to herein as the consistent read layer. In systems that support snapshots, the consistent read layer includes a derivation mechanism. To derive a version of a data item, the derivation mechanism requires an existing version of the data item and information required to derive the desired version of the data item from the existing version of the data item. The information required to derive a particular version of a data item is hereinafter referred to as "derivation data". In a database system that uses snapshots, the derivation data may include, in addition to an existing version of a data item, transaction state information of the transactions that have updated the data item, and information from undo records associated with the data item.

Undo records are records that indicate how to undo the changes that were made by transactions during update operations that corresponds to the undo records. In the example given above, assume that transactions TXA, TXB and TXC respectively generated undo records UNDO1, UNDO2 and UNDO3 in response to updating DATA1 . To derive a version of the DATA1 for TXD, the database system would require the current version of DATA1 and undo record UNDO3.

Figure 1A:
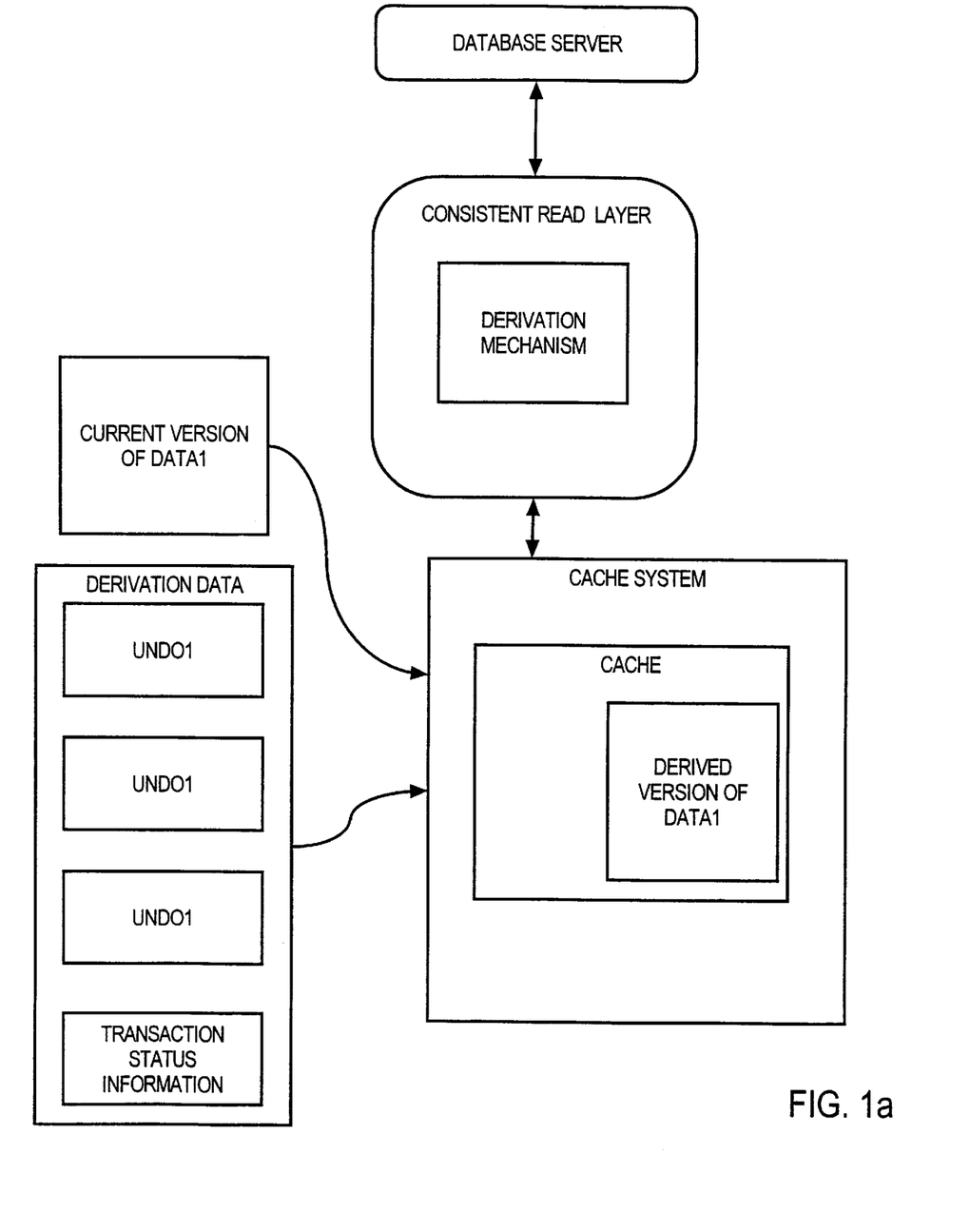
FIG. 1a is a block diagram illustrating how derived data items are supplied to a database server in a single-server environment.

FIG. 1a illustrates components of a database system involved in a data derivation operation. The database server requests from the consistent read layer a version of DATA1 that belongs to a particular snapshot of the database. The consistent read layer determines what information will be required to derive the desired version of DATA1, and requests the required information from the local cache system. The cache system retrieves the current version of DATA1, undo records associated with DATA1 and transaction status information. The transaction status information indicates whether the transactions that updated DATA1 are committed, and the commit times of those transactions that are committed.

Based on the transaction information, the consistent read layer determines which of the undo records must be applied to the current version of DATA1 to create the desired version of DATA1 . A derivation mechanism within the consistent read layer applies the appropriate undo records to the current version of DATA1 to generate the desired, derived version of DATA1. The derived version of DATA1 is stored in the cache. The database server then reads the derived version of DATA1 from the cache.

Figure 1B:
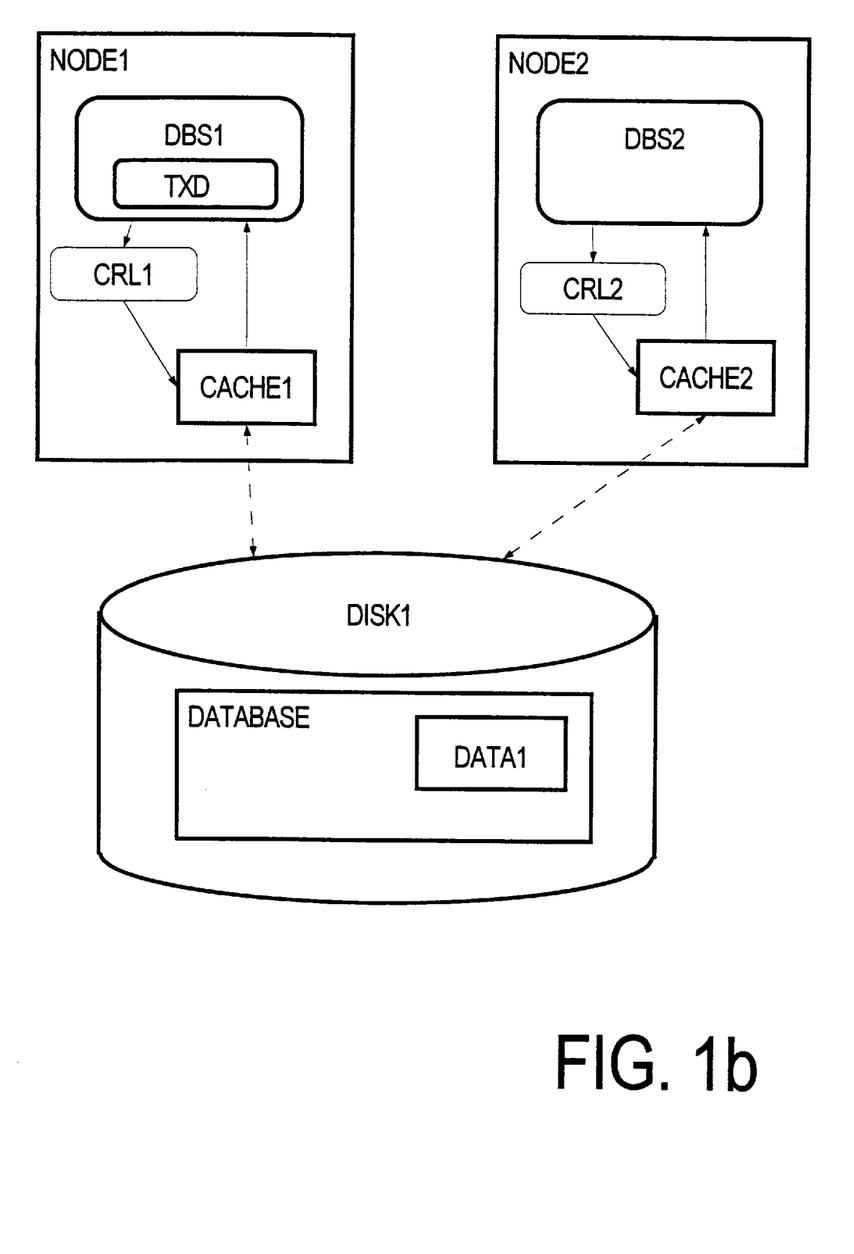
FIG. 1b is a block diagram illustrating how pings may occur in a multiple-server environment.

Multiple-server environments are environments that allow more than one database server to simultaneously access a single database. FIG. 1b is a block diagram illustrating a multiple-server environment that includes two nodes NODE1 and NODE2, each of which is executing a different database server DBS1 and DBS2. These nodes generally represent distinct processing entities. For example, each node may be one or more processors in a multi-processing machine, or a workstation on a network system.

Both database servers DBS1 and DBS2 have access to the database that contains the data item DATA1. Database servers DBS1 and DBS2 have their own consistent read layers CRL1 and CRL2 and caches CACHE1 and CACHE2, respectively. The storage device DISK1 generally represents one or more storage devices on which the database containing DATA1 is stored. Such storage devices may include, for example, optical or magnetic disks.

In typical multiple-server environments, the database servers DBS1 and DBS2 and consistent read layers CRL1 and CRL2 are not aware that other database servers are using the same database. Therefore, the database servers and the consistent read layers function as described above with respect to a single server environment. Specifically, the database servers issue all data requests to their respective consistent read layers, and the consistent read layers request all derivation data from cache systems local to the database servers, regardless of where the information required to derive the requested data resides.

In multiple-server environments, circumstances arise in which the version derivation process is very inefficient. For example, assume that many transactions in database server DB2 have made changes to a data item DATA1, where some of the transactions committed before time T, and some of the transactions committed after time T or are still active. Under these conditions, the latest version of DATA1 will typically be stored in CACHE2. In addition, much of the derivation data required for deriving a version of DATA1 will also be stored in CACHE2.

Such derivation data may include, for example, the undo records generated when the transactions in DBS2 updated DATA1. The derivation data may also include transaction state information that indicates which of the transactions that updated DATA1 have committed, and the commit times of the transactions that committed.

Assume that a transaction TXD executing in database server DBS1 requires a version of DATA1 that reflects a snapshot time T. To supply TXD with the DATA1, DBS1 requests the appropriate version of DATA1 from its consistent read layer CRL1. CRL1 determines what information will be required to derive the requested version of DATA1, and requests the derivation data from the local cache, CACHE1. CACHE1 does not currently contain the requested version of DATA1, so CACHE1 requests the information that will be required to create that requested version of DATA1.

In the present example, creation of the requested data will require the latest version of DATA1 and the undo records required to create the appropriate version of DATA1 from the latest version of DATA1. Much or all of this information is currently stored in CACHE2 on NODE2. A situation such as this where data from a cache on one node must be supplied to the cache system on another node is referred to as a "ping".

Handling a ping typically involves a significant amount of overhead. In the present example, the derivation data for the desired version of DATA 1 is written from CACHE2 to DISK1. CACHE1 loads the current version of DATA1 and the derivation data from DISK1. During this process, various messages must be sent between the cache systems and one or more lock manager units of the lock manager system that manages access to DATA1. Once the necessary data is loaded into CACHE1, the derivation mechanism in CRL1 derives a version of DATA1 that reflects time T from the derivation data.

Specifically, the derivation mechanism in CRL1 inspects the transaction state information shipped from NODE2 to determine which transactions were not committed at time T. Then the derivation mechanism creates a version of DATA1 as of time T by applying the undo records associated with the transactions that were not committed at time T to the latest version of DATA1. The derived version of DATA1 is then stored in CACHE1, and supplied to TXD from CACHE1.

The overhead required to transfer all of the derivation data from the cache of one node to another node renders snapshot-based techniques inefficient in multiple-server environments. Therefore, it is clearly desirable to provide a system that supports snapshots but which does not require the transfers of large amounts of data between nodes when pings occur.

SUMMARY OF THE INVENTION

A method and apparatus for supplying a particular version of a data item to a transaction executing in a first database server is provided. The data item is in a database accessible by the first database server and one or more other database servers. The method involves determining whether a current version of the data item resides in a cache that is remote relative to the first database server. If the current version of the data item does not reside in a cache that is remote relative to the first database server, then a first derivation mechanism that is local to the first database server to derives the particular version of the data item from the current version of the data item.

If the current version of the data item resides in a cache that is remote relative to the first database server, then a second derivation mechanism that is local to the cache derives the particular version of the data item from the current version of the data item. Once built, the particular version of the data item sent to the first database server.

Determining whether a current version of the data item resides in a cache that is remote relative to the first database server may be performed by determining whether a cache currently holds a write lock on the data item, and if a cache currently holds a write lock on the data item, then determining whether the process is remote relative to the first database server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for handling pings is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
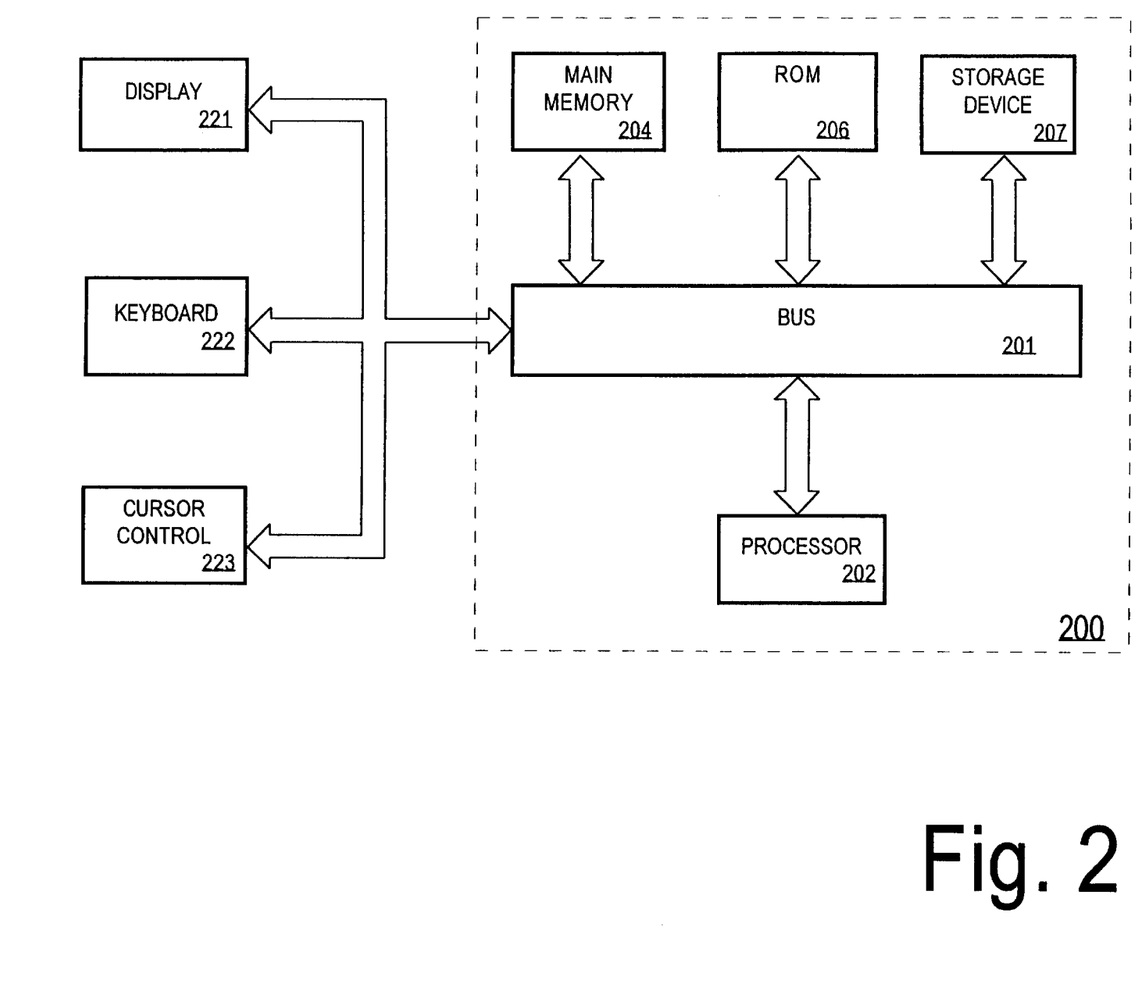
FIG. 2 is a block diagram of a computer system on which an embodiment of the present invention may be implemented.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to reduce the overhead involved when a process running on computer system 200 requires a derived version of a data item when the derivation data resides in the memory of another computer system. According to one embodiment, processor 202 implements the present invention by executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

REMOTELY REQUESTED DERIVATION OPERATIONS

As mentioned above, prior art database systems that use snapshot mechanisms to enforce database consistency use a derivation mechanism that is local to a database server to perform all derivation operations required by the database server. The local derivation mechanism can efficiently perform the derivation operation when the derivation data is stored on disk or in a cache that is local to the derivation mechanism. However, it is very inefficient for the local derivation mechanism to perform the derivation operation when the derivation data is located in a cache that is remote to the derivation mechanism.

According to one aspect of the invention, a multiple-server environment is provided in which the derivation mechanism that is actually invoked to perform a derivation operation is the derivation mechanism that can most efficiently perform the derivation operation, even if the derivation mechanism does not reside on the same node as the server that requires the derived version of the data item.

Figure 3:
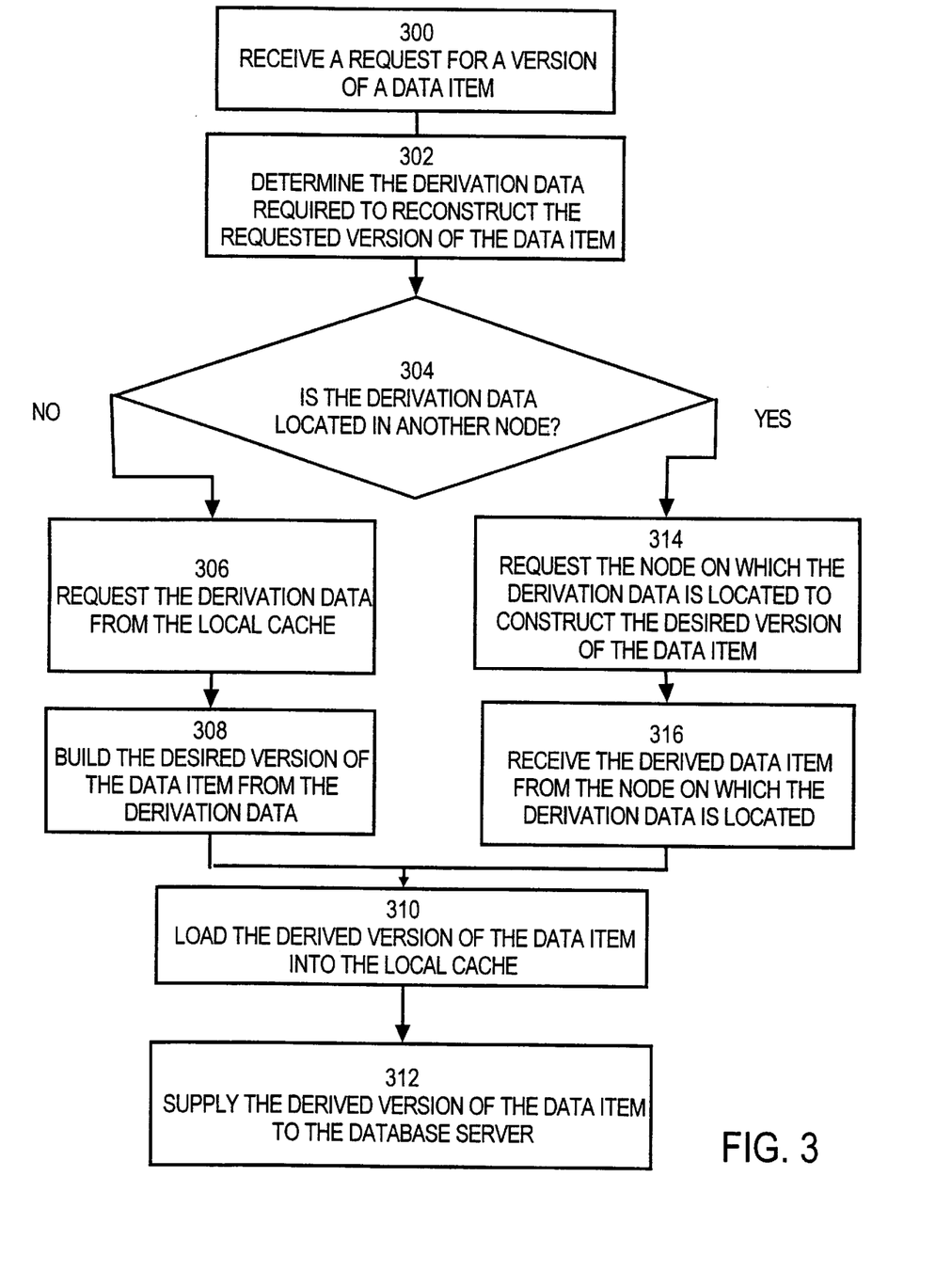
FIG. 3 is a flow chart illustrating steps for supplying derived data to a database server according to an embodiment of the invention.

FIG. 3 is a flow chart that illustrates steps for supplying a derived version of a data item to a database server that is executing a transaction that requires the derived version of the data item (the "requesting server").

At step 300, the request for a version of the data item is received by the consistent read layer located on the same node as the requesting server. At step 302, the consistent read layer that received the request determines what data will be required to derive the requested version of the data item.

At step 304, the consistent read layer determines whether the derivation data is located in another node. Various techniques may be used to make this determination. According to one embodiment, the multiple-server environment includes a cache coherency mechanism which stores information about which data items are stored in each of the caches, and the lock modes held on the various data items by the various database servers in the multiple-server environment. According to this embodiment, execution of step 304 may involve inspecting the data maintained by the cache coherency mechanism to determine whether any database server has an exclusive mode lock on the data item.

Typically, if the database server has an exclusive mode lock on the data item, one or more transactions in the database server will be updating the data item, or will have recently updated the data item. Consequently, the current version of the data item, the undo and redo information associated with the recent updates, and transaction status information for the transaction that recently performed the updates, will all be present in the cache of the node on which that database server is running.

If at step 304 it is determined that the derivation data is not located in another node, control passes to step 306. In a database system which makes the determination at step 304 based on ownership of an exclusive lock on the data item, control would pass to step 306 if no database server held an exclusive lock on the data item, or if an exclusive lock on the data item is held by the database server that is making the request. If, at step 304, it is determined that the derivation data is located in another node, control passes to step 314.

At step 306, the derivation data is requested from the local cache. In response to this request, the local cache retrieves any of the derivation data that is not already present in the local cache. Typically, the retrieval of this information does not involve a significant amount of overhead because the derivation data is not located in the cache of another node. Once the derivation data has been retrieved pursuant to step 306, the derivation mechanism that is local to the requesting server builds the desired version of the data item. At step 310, the derived version of the data item is loaded into the cache that is local to the database server that requested the data item. At step 312, the derived version of the data item is supplied to the database server.

As mentioned above, control proceeds to step 314 if at step 304 it is determined that the derivation data is located in another node. At step 314, a request is sent to the node on which the derivation data is located. However, the request sent at step 314 is not a request for the derivation data itself, but rather a request for the node on which the derivation data is located (the "remote node") to construct the desired version of the data item. In response to receiving the request issued at step 314, a derivation mechanism on the remote node performs the desired derivation operation. Once the desired version of the data item has been derived on the remote node, the derived version of the data item is transmitted to the node on which resides the requesting server.

At step 316, the derived version of the data item is received from the remote node by the node on which the requesting server is located. From step 316, control proceeds to steps 310 and 312 where the derived version of the data item is loaded into the cache that is local to the requesting database server, and the derived version of the data item is supplied to the requesting database server.

While an embodiment of the invention is described above with respect to a multiple-server database environment, the invention is applicable to all environments in which a request for derivation data may result in a ping. Such environments typically include a multiple-level storage system in which at least one of the storage levels is shared between nodes and at least one of the storage levels is not shared between nodes.

Figure 4:
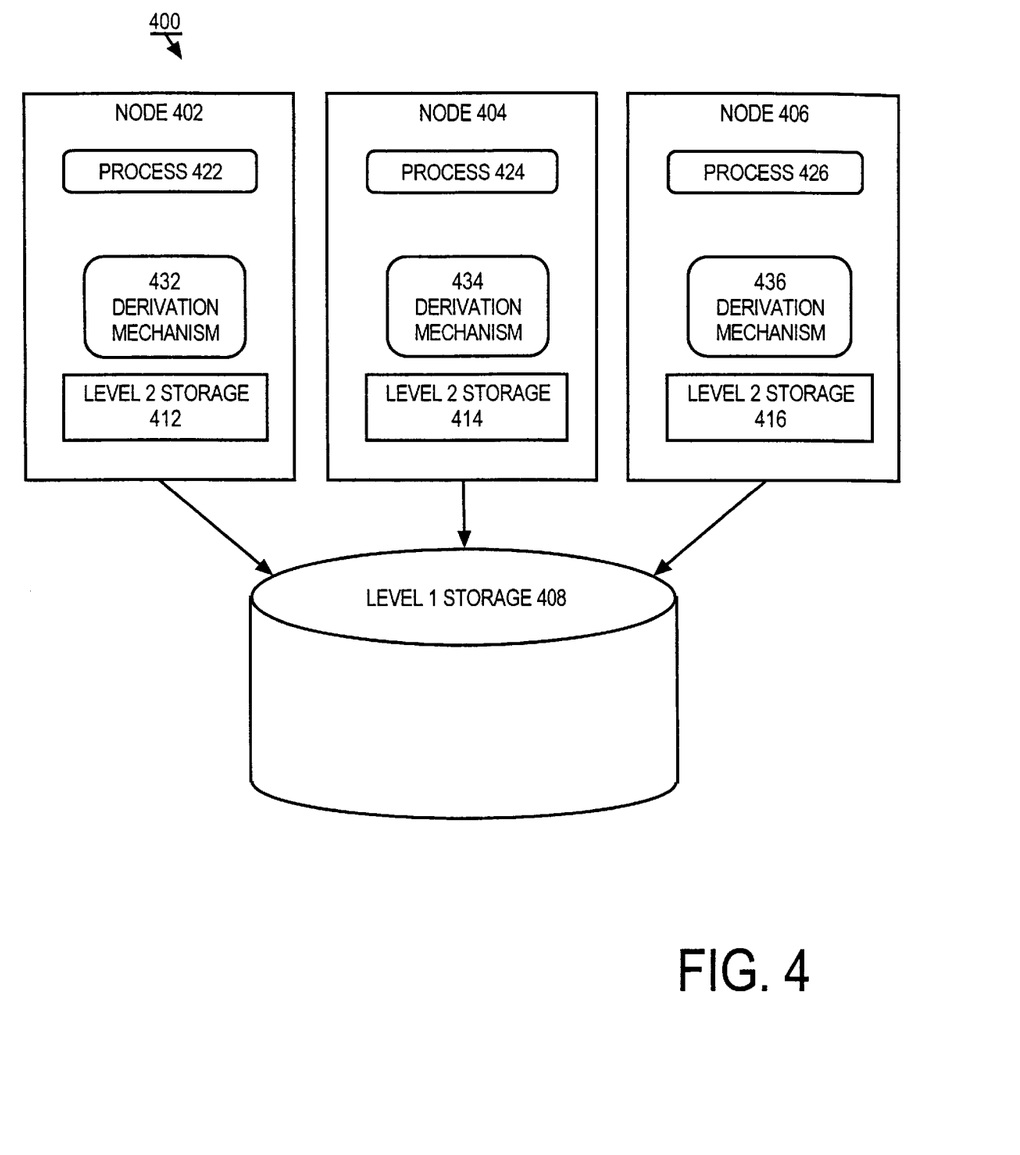
FIG. 4 is a block diagram of a multiple-node system with a multiple-level storage system on which an embodiment of the present invention may be implemented.

For example, FIG. 4 illustrates a system 400 in which processes on a plurality of nodes 402, 404 and 406 have separate level 2 storage 412, 414 and 416, but share access to a level 1 storage 408. Each level 2 storage may be, for example, a cache memory, while the level 1 storage is shared dynamic and/or persistent memory. Nodes 402, 404 and 406 are executing processes 422, 424 and 426, respectively. Before one of processes 422, 424 and 426 can access an object, the object must be loaded into the level 2 storage that resides on the same node as the process.

Nodes 402, 404 and 406 further include derivation mechanisms 432, 434 and 436, respectively. When one of processes 422, 424 and 426 requires an object that is derived from existing data (a "derived object"), the derivation mechanism with the most efficient access to the derivation data creates the derived object. Thus, if the derivation data resides in level 2 storage 412, derivation mechanism 432 performs the derivation operation to create the derived object. If the derivation data resides in level 2 storage 414, derivation mechanism 434 builds the derived object. Similarly, derivation mechanism 436 builds derived objects when the derivation data is in level 2 storage 416.

If the derivation data is in the shared level 1 storage 408, the derivation mechanism that resides on same node as the process that requires the derived object loads the derivation data into its associated level 2 storage and builds the derived object. If the derivation mechanism that builds a derived object is not on the same node as the process that requires the derived object, the derived object is stored to the shared level 1 storage 408 and then loaded into the level 2 storage of the node on which resides the process that requires the derived object.

In the foregoing description, embodiment of the inventions were described in which it was assumed that all of the derivation data was located together. However, portions of the derivation data may be located in different locations. For example, portions of the derivation data to build a derived object required by process 422 may be located in level 2 storage 412, level 2 storage 414, level 2 storage 416 and level 1 storage 408, or any combination thereof.

Under these circumstances, the determination of which derivation mechanism would most efficiently derive a data item could take into account multiple factors, such as the location of the requesting process and the location and size of each of the portions of the derivation data. Thus, if a small portion of the derivation data for the derived object desired by process 422 resides in level 2 storage 412, and a large portion of the derivation data resides in level 2 storage 414, then derivation mechanism 434 may be selected to perform the derivation operation. On the other hand, if level 2 storage 412 and level 2 storage 414 contain approximately equal amounts of the derivation data, then derivation mechanism 432 may be selected to perform the derivation operation because it resides on the same node as the requesting process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for supplying a particular version of a data item to a transaction executing in a first database server, where the data item is in a database accessible by the first database server and one or more other database servers, the method comprising the steps of:

determining whether a current version of the data item resides in a cache that is remote relative to the first database server;

if the current version of the data item does not reside in a cache that is remote relative to the first database server, then causing a first derivation mechanism that is local to the first database server to derive the particular version of the data item from the current version of the data item; and if the current version of the data item resides in a cache that is remote relative to the first database server, then causing a second derivation mechanism that is local to the cache to derive the particular version of the data item from the current version of the data item; and sending the particular version of the data item to the first database server.

2. The method of claim 1 wherein the step of determining whether a current version of the data item resides in a cache that is remote relative to the first database server includes the steps of:

determining whether a process currently holds a write lock on the data item; and if a process currently holds a write lock on the data item, then determining whether the process is remote relative to the first database server.

3. A method for supplying a derived object to a process executing in a node of a plurality of nodes, said plurality of nodes being coupled to a multiple-layer storage system that includes one or more shared storage layers and one or more private storage layers, the method comprising the steps of:

determining derivation data required to build said derived object;

determining where said derivation data is located within said multiple-layer storage system;

selecting a selected node from said plurality of nodes based on where said derivation data is located within said multiple-layer storage system;

causing a derivation mechanism executing on said selected node to build said derived object from said derivation data; and if said derivation mechanism is not located on the same node as the process, then sending the derived object from said selected node to the node on which the process is executing.

4. The method of claim 3 wherein the step of causing a derivation mechanism executing on said selected node to build said derived object from said derivation data includes the step of sending any reconstruction data that is not currently in the one or more private storage layers of the selected node to said one or more private storage layers of the selected node.

5. The method of claim 3 wherein:

said derived object is derived based on an existing object; and the step of determining where said derivation data is located within said multiple-layer storage system includes determining where a current version of said existing object is located within said multiple-layer storage system.

6. The method of claim 5 wherein:

the current version of said existing object resides in said one or more private storage layers of a particular node; and the step of selecting a selected node from said plurality of nodes includes selecting said particular node as said selected node.

7. The method of claim 5 wherein:

the current version of said existing object resides in said one or more shared storage layers; and the step of selecting a selected node from said plurality of nodes includes selecting the node on which said process resides as said selected node.

8. The method of claim 3 wherein:

portions of said derivation data are stored in said one or more private storage layers on more than one node of said plurality of nodes; and the method includes the step of determining sizes of said portions of said derivation data; and the step of selecting a selected node from said plurality of nodes is based on said sizes and where said portions are located in said multiple-layer storage.

9. The method of claim 3 wherein:

a plurality of database servers are executing on said plurality of nodes;

said one or more shared storage layers include one or more shared disks containing a database;

said derived object is a particular version of a data item in said database; and said derivation data includes a current version of said data item.

10. The method of claim 9 wherein:

the step of determining where said derivation data is located within said multiple-layer storage system includes determining which node of said plurality of nodes currently stores the current version of the data item; and the step of selecting a selected node includes selecting the node of said plurality of nodes that currently stores the current version of the data item.

11. The method of claim 10 wherein the step of determining which node of said plurality of nodes currently stores the current version of the data item includes determining which database server of said plurality of database servers holds an exclusive mode lock on said data item.

12. A computer readable medium having stored thereon sequences of instructions for supplying a derived object to a process executing in a node of a plurality of nodes, said plurality of nodes being coupled to a multiple-layer storage system that includes one or more shared storage layers and one or more private storage layers, the sequences instructions including sequences of instructions for performing the steps of:

determining derivation data required to build said derived object;

determining where said derivation data is located within said multiple-layer storage system;

selecting a selected node from said plurality of nodes based on where said derivation data is located within said multiple-layer storage system;

causing a derivation mechanism executing on said selected node to build said derived object from said derivation data; and if said derivation mechanism is not located on the same node as the process, then sending the derived object from said selected node to the node on which the process is executing.

13. The computer readable medium of claim 12 wherein the step of causing a derivation mechanism executing on said selected node to build said derived object from said derivation data includes the step of sending any reconstruction data that is not currently in the one or more private storage layers of the selected node to said one or more private storage layers of the selected node.

14. The computer readable medium of claim 12 wherein:

said derived object is derived based on an existing object; and the step of determining where said derivation data is located within said multiple-layer storage system includes determining where a current version of said existing object is located within said multiple-layer storage system.

15. The computer readable medium of claim 14 wherein:

the current version of said existing object resides in said one or more private storage layers of a particular node; and the step of selecting a selected node from said plurality of nodes includes selecting said particular node as said selected node.

16. The computer readable medium of claim 14 wherein:

the current version of said existing object resides in said one or more shared storage layers; and the step of selecting a selected node from said plurality of nodes includes selecting the node on which said process resides as said selected node.

17. The computer readable medium of claim 12 wherein:

portions of said derivation data are stored in said one or more private storage layers on more than one node of said plurality of nodes; and the computer readable medium further includes sequences of instructions for performing the step of determining sizes of said portions of said derivation data; and the step of selecting a selected node from said plurality of nodes is based on said sizes and where said portions are located in said multiple-layer storage.

18. The computer readable medium of claim 12 wherein:

a plurality of database servers are executing on said plurality of nodes;

said one or more shared storage layers include one or more shared disks containing a database;

said derived object is a particular version of a data item in said database; and said derivation data includes a current version of said data item.

19. The computer readable medium of claim 18 wherein:

the step of determining where said derivation data is located within said multiple-layer storage system includes determining which node of said plurality of nodes currently stores the current version of the data item; and the step of selecting a selected node includes selecting the node of said plurality of nodes that currently stores the current version of the data item.

20. The computer readable medium of claim 19 wherein the step of determining which node of said plurality of nodes currently stores the current version of the data item includes determining which database server of said plurality of database servers holds an exclusive mode lock on said data item.

* * * * *